United States Patent [19]

Steckler

[11] 3,767,943

[45] Oct. 23, 1973

[54] DIRECT-COUPLED TRIGGERED FLIP-FLOP

[75] Inventor: Steven Alan Steckler, Clark, N.J.

[73] Assignee: RCA Corporation, New York, N.Y.

[22] Filed: Nov. 3, 1972

[21] Appl. No.: 303,414

[52] U.S. Cl. .................................. 307/292, 307/296
[51] Int. Cl. ............................................ H03k 3/286
[58] Field of Search ............................. 307/292, 296

[56] References Cited

UNITED STATES PATENTS

| | | | |
|---|---|---|---|
| 3,247,399 | 4/1966 | Moody | 307/292 X |
| 3,402,305 | 9/1968 | Gilligan | 307/292 |
| 3,504,201 | 3/1970 | Richardson | 307/292 |

*Primary Examiner*—John S. Heyman
*Attorney*—Eugene M. Whitacre

[57] ABSTRACT

Each of first and second grounded-emitter amplifier transistors has a diode connected between its collector electrode and the base electrode of the other to provide a storage flip-flop. Third and fourth transistors have collector electrodes, each coupled to a source of triggering pulses by similar resistors; cross-coupled collector and base electrodes; and emitter electrodes, each connected to a separate one of the base electrodes of the first and second transistors and each connected to ground reference potential by a resistor. So connected, the third and fourth transistors provide a commutating flip-flop, functioning as a steering network for trigger pulses and providing for short term memory of the previous state of the storage flip during its transition in response to a triggering impulse. The use of diodes to cross-couple the collector and base electrodes of the first and second transistors in the storage flip-flop permits fast transitions of the storage flip-flop despite the use of pinch resistor collector loads for the first, second, third and fourth transistors and restricted amplitude triggering pulses, which are employed to reduce power consumption of the direct-coupled triggered flip-flop.

1 Claim, 2 Drawing Figures

DIRECT-COUPLED TRIGGERED FLIP-FLOP

The present invention is directed to direct-coupled triggered flip-flops.

Direct-coupled flip-flops are suited for construction in integrated circuit form. Such a flip-flop commonly comprises not only a "storage flip-flop" which changes state only in response to a triggering pulse but an auxiliary "commutating flip-flop" which provides the temporary memory of the previous state of the storage flip-flop required during transitions of logic state in the storage flip-flop.

The present invention is embodied in a direct-coupled triggered flip-flop having four three-terminal devices each having an input, a common and an output electrode. First and second direct coupling means connect the respective output electrodes of each of the first and second of these devices to the input electrodes of the other. First and second resistive means respectively couple the output electrodes of the first and second devices to a source of triggering signals. Third and fourth direct coupling means respectively connect each of the common electrodes of the first and second devices to separate ones of the input electrodes of the third and fourth devices. There is a means providing first and second terminals for connection to a source of operating potential. The common electrodes of the third and fourth transistors are connected to the first terminal. Third and fourth resistive means respectively couple each of the output electrodes of the third and fourth devices to the second terminal. Fifth and sixth resistive means respectively couple each of the input electrodes of the third and fourth devices to the first terminal. A first unilaterally conductive element is connected between the third device output electrode and the fourth device input electrode in a poling to exhibit easy conduction when the third device is least conductive between its output and common electrodes. A second unilaterally conductive element is connected between the fourth device output electrode and the third device input electrode in a poling to exhibit easy conduction when the fourth device is least conductive between its output and common electrodes.

The present invention will be better understood, particularly with regard to its features distinguishing over the prior art, from the ensuing specification and the accompanying drawing in which.

Figure 1:
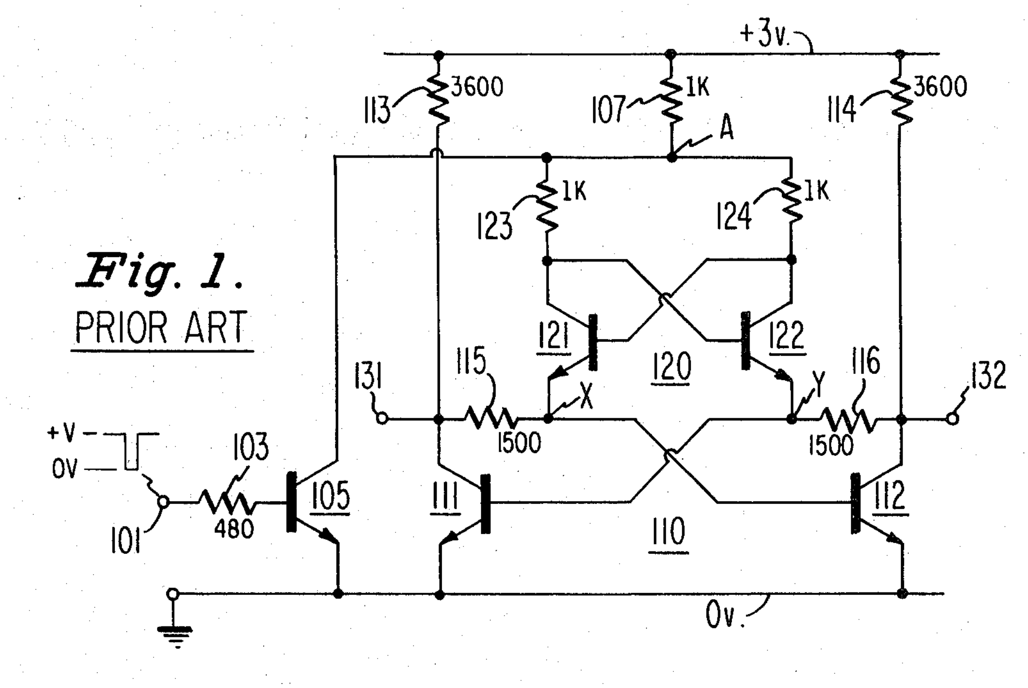
Fig. 1. PRIOR ART
FIG. 1 is a schematic circuit diagram of a prior art direct-coupled triggered flip-flop.

Referring to FIG. 1, the prior art circuit therein shown appeared under the title "New Binary Counter Circuit" in ELECTRONICS LETTERS Dec. 1965, Vol. 1, No. 10, p. 273 as published by the Institution of Electrical Engineers. The circuit is shown in a form suitable for application of negative-going clock pulses to terminal 101, which are coupled via resistor 103 to the base electrode of a transistor 105. The transistor 105 and its collector load resistor 107 are connected in a common-emitter transistor amplifier configuration which inverts the clock pulse, providing a positive-going pulse at point A.

The storage flip-flop 110 comprises the transistors 111 and 112, presumed initially to be respectively in conductive and non-conductive states, and resistors 113, 114, 115, 116. The collector current of transistor 111 will cause a substantial potential drop across its collector load resistor 113 and a consequently reduced collector potential for transistor 111. Since transistor 112 in its non-conductive state provides no collector current to flow through its collector load resistor 114, there will be no substantial potential drop across resistor 114 corresponding to that across resistor 113, and the collector potential of transistor 112 will consequently be high as compared to that of transistor 111. The reduced collector potential of transistor 111 as coupled via resistor 115 to the base electrode of transistor 112 will fail to forward-bias the base-emitter junction of transistor 112 into conduction. The high collector potential of transistor 112 as coupled via resistor 116 to the base electrode of transistor 111 will maintain transistor 111 in conduction.

The potential at point X as coupled from the collector electrode of transistor 111 will be substantially lower than the potential at point Y as coupled from the collector electrode of transistor 112. As the clock pulse causes point A to rise the base potentials of transistors 111 and 112 rise because of coupling through the commutating flip-flop 120 which comprises elements 121, 122, 123, 124. Point X is pulled up by the series connection of the base-emitter junction of transistor 121 and resistor 124; point Y, by the series connection of the base-emitter junction of transistor 122 and resistor 123.

Since point X is lower in potential, transistor 121 commences to conduct while transistor 122 remains non-conductive, because of the larger base-emitter potential on transistor 121, the base potentials of the transistors 121, 122 having initially been the same because of circuit symmetry when their base-emitter junctions are non-conducting. The increased collector current flow in transistor 121 causes a potential drop across its collector load resistor 123, depressing its collector potential. This depressed collector potential as coupled to the base electrode of transistor 122 biases it further out of conduction. The commutating flip-flop 120 is maintained in this condition so long as the clock pulse is applied at terminal 101 and point A is consequently high in potential.

Meanwhile the emitter current flow from the transistor 121 flowing to the base electrode of transistor 112 biases it into conduction, lowering its collector potential and thereby removing the forward bias potential applied to the base-emitter junction of transistor 111. The relative conduction and non-conductive states of the transistors 111 and 112 are thereby reversed. When the point A is lowered in potential by the transistor 105 returning to its conductive state after the clock pulse, these new states of the storage flip-flop transistors 111, 112 are retained.

A subsequent clock pulse will return transistors 111 and 112 to conductive and non-conductive states, respectively, in a manner similar to that previously described.

The prior art circuit just described is designed for monolithic silicon construction using simple diffused resistors throughout. It is often desired to reduce the power consumption of triggered direct-coupled flip-flops by employing higher resistance pinch resistors in their structure. A pinch resistor is formed by diffusing a constriction into a resistor previously diffused into a monolithic silicon structure. Higher resistance collector load resistors 113, 114 in the storage flip-flop reduce power consumption appreciably. Where triggering recurs frequently and the triggering pulses tend to be sustained for long intervals, conditions frequently encountered in direct-coupled logic configurations, higher resistance collector load resistors 123, 124 in the commutating flip-flop 120 also reduce power consumption appreciably.

The resistors 115 and 116 should be chosen to have small enough resistance to avoid potential divider action between them and the base electrode input impedance of transistors 111 and 112, respectively, to maintain the positive feedback required to switch the storage flip-flop 110 between logic states rapidly and surely with a positive latching action. If the resistors 115, 116 are low in resistance then resistors 123, 124 must be low in resistance or the triggering pulses applied to point A must be larger. This is necessary to provide sufficient triggering current to overcome the clamping action of the conductive one of the transistors 111, 112 as coupled through the resistors 115 or 116 coupling its collector electrode to the commutating flip-flop 120. This requirement conflicts with the desire to keep the resistance of resistors 123, 124 larger and the triggering pulse height at point A less positive so as to reduce power consumption of the commutating flip-flop 120.

The binary counter circuit of FIG. 1 has an upper logic output level at its terminals 131, 132 at the collector electrodes of transistors 111, 112, respectively, which is dependent upon the operating potential to which resistors 113, 114 are returned. This upper logic output level tends to be somewhat indeterminant, in that it depends upon potential divider action between resistors (113, 115 or 114, 116) and the base input impedance of a transistor (111 or 112). This indeterminancy is worsened if the resistor 113, 114 are pinch resistors and the resistors 115, 116 are simple diffused resistors. Substantially fixed logic output levels are preferable in a binary counter circuit to simplify connection to subsequent logic elements.

Figure 2:
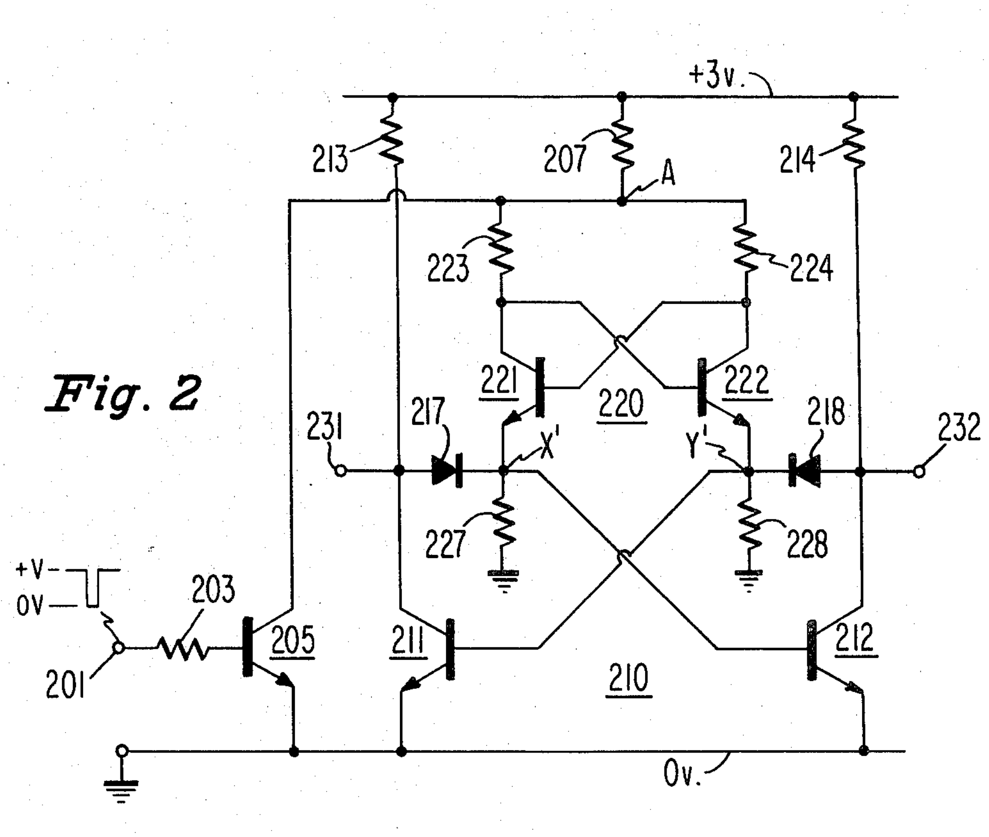
FIG. 2 is a schematic circuit diagram of a direct-coupled triggered flip-flop embodying the present invention.

These problems are solved by the circuitry shown in FIG. 2, in which the storage flip-flop 210 comprises transistors 211, 212; resistors 213, 214 and diodes 217, 218. Resistors 227 and 228 bias points X' and Y' to ground reference potential when the diode and transistors coupled to each of them (211, 217, 221 and 212, 218, 222, respectively) are non-conductive. Together with transistors 221, 222 and resistors 223, 224 the resistors 227, 228 provide a commutating flip-flop 220.

For purposes of analysis, transistors 221 and 212 of the storage flip-flop 210 are presumed to be initially in conductive and non-conductive states, respectively. Since the transistor 212 provides no collector current to help develop a potential drop across resistor 214, the potential at its collector electrode is high and forward biases the diode 218 and the base-emitter junction of transistor 211. The forward bias applied to the base-emitter junction of transistor 211 maintains the transistor 211 in its conductive state with an offset voltage $V_{be}$ between its base and emitter electrode.

The collector current of the conductive transistor 211 causes a potential drop across resistor 213. The potential at the collector electrode of transistor 211 is low, being clamped substantially to ground reference potential. Since there is no forward bias applied to the diode 217 from the collector electrode of transistor 211, the diode 217 is non-conductive, isolating point X' from the collector electrode of transistor 211. The potential at point X' is held near ground reference potential by the resistor 227. The emitter electrode of transistor 222 is held to a higher potential by potential divider action between elements 214, 218 and the parallel combination of resistor 228 and base electrode circuit of the conductive grounded emitter transistor 211. As the clock pulse applied to terminal 201 causes point A to rise, the base potentials of transistors 221 and 222 rise because of coupling through resistors 223, 224. Since X' is held at lower potential than Y', transistor 221 is biased into conduction before transistor 222 can be. The conduction of transistor 221 causes a potential drop across resistor 223, which applied to the electrode of transistor 222 maintains it non-conductive. Accordingly, there is no significant potential drop across resistor 224 which otherwise might be caused by collector current flow in transistor 222, so the conduction of transistor 221 is not inhibited. Transistor 222 will remain non-conductive even when its emitter electrode is subsequently lowered in potential with respect to that of transistor 221 with the change in state of the storage flip-flop 210.

The emitter current of transistor 221 increases the potential drop through resistor 227 thereby raising the potential at point X' to overcome the base-emitter junction offset potential of transistor 212 and bias it into conduction. The collector current provided by transistor 212 as it is biased into conduction causes a potential drop across resistor 214 whereby the collector potential of transistor 212 is lowered, removing forward bias from the diode 218 and the base-emitter junction of transistor 211. The increasing resistance of the diode 218 as forward bias is lessened speeds the cutting off of transistor 211. The reduction of the collector current of transistor 211 lessens the potential drop across resistor 213 and the collector electrode of transistor 211 rises in potential, forward biasing the diode 217 and decreasing its impedance. This further forward biases the base-emitter junction of transistor 212 speeding its turn on. When the point A is reduced in potential so that current no longer flows through transistor 221, current flows through resistor 213 and diode 217 continues to supply base current to transistors 212 to maintain it in conduction.

A subsequent clock pulse will return transistors 211 and 212 to conductive and non-conductive states, respectively, in a manner similar to that just described.

The fact that the diode 217 was essentially non-conductive once triggering was initiated permits the resistances 223, 224 of the commutating flip-flop 220 to be kept considerably higher in impedance level than the forward impedance of the diodes 217, 218. There is no need to deliver triggering signal energy through the commutating flip-flop 220 to lift the clamp provided by the conductive one of the transistors 211, 212. The resistors 223, 224 need only be low enough in resistance so that the base-emitter potential offset of the cut-off transistor is exceeded during triggering. By the time the diode 217 had been biased into forward condition, the change in state in the storage flip-flop 210 was so far accomplished that its positive feedback applied through the diode 217 coming into conduction completed the latching of transistor 212 into conduction and transistor 211 out of conduction.

The diodes 217, 218 present relatively low impedances for the portion of the circuit operation where it is desired they have low impedance to increase positive feedback and positive latching in the storage flip-flop 210. The diodes 217, 218 present relatively high impedance during the portion of the circuit operation where it is desired they have high impedance so as not to interfere with the commutating flip-flop 210 triggering a change of state in the then non-conductive transistor 211 or 212 of the storage flip-flop 210. Consequently since no compromise fixed impedance is demanded of the elements cross-coupling the collector and base electrodes of transistors 211, 212, the selection of these relatively low and high impedances is much less critical than the selection of a fixed impedance.

Less critical relative component tolerances substantially increase yields when the circuit is constructed in monolithic integrated circuit form. In a typical integrated circuit construction resistors 213, 214, 227, 228 are nominally 20 kilohm pinch resistors and resistors 223, 224 are nominally 10 kilohm pinch resistors.

The potentials at the terminals 231, 232 for each state of the flip-flop are well defined as compared to the prior art device of FIG. 1. In its high state the terminal 231 (or 232) will be at the sum of the offset potential of the diode 217 (or 218) and the base-emitter junction of transistor 212 (or 211). For simple silicon devices this sum potential will be 1.3 – 1.4 volts despite power supply variations. In its low state the terminal 231 (or 232) will be at the saturation potential of the transistor 211 (or 212) which is 0.2 volt or less. If a larger difference in logic levels is desired the transistors 211, 212 can be compound transistors connected in Darlington configuration and/or the diodes 217, 218 can be compound devices each comprising, for example, a plurality of serially connected semiconductor junctions. The diodes 217, 218 may also be unilateral devices each formed by transistor with its base electrode connected to the midpoint of a resistive potential divider connected between its collector and emitter anode and cathode, in order to obtain a larger difference in logic levels without sacrificing definition of their potentials.

What is claimed is:

1. Direct-coupled triggered flip-flop comprising:

first, second, third and fourth three-terminal semiconductor amplifier devices each having an input, a common and an output electrode;

first direct coupling means connecting said first device output electrode to said second device input electrode;

second direct coupling means connecting said second device output electrode to said first device input electrode;

a source of triggering signals;

first and second resistive means respectively coupling each of said output electrodes of said first and said second devices to said source of triggering signals;

third and fourth direct coupling means respectively connecting each of said common electrodes of said first and said second devices to separate ones of said input electrodes of said third and said fourth devices;

means providing first and second terminals for connection to a source of operating potential, said common electrodes of said third and said fourth devices each being connected to said first terminal;

third and fourth resistive means respectively coupling each of said output electrodes of said third and said fourth devices to said second terminal;

fifth and sixth resistive means respectively coupling each of said input electrodes of said third and said fourth devices to said first terminal;

a first unilaterally conductive element connected between said third device output electrode and said fourth device input electrode in a poling to exhibit easy conduction when said third device is least conductive between its said output and said common electrodes; and a second unilaterally conductive element connected between said fourth device output electrode and said third device input electrode in a poling to exhibit easy conduction when said fourth device is least conductive between its said output and said common electrodes.

* * * * *